United States Patent [19]
Shaw

[11] 3,866,107
[45] Feb. 11, 1975

[54] STARTING CIRCUIT FOR INVERTER

[75] Inventor: Benjamin Chandler Shaw, Granada Hills, Calif.

[73] Assignee: The Bendix Corporation, North Hollywood, Calif.

[22] Filed: Jan. 28, 1974

[21] Appl. No.: 437,451

[52] U.S. Cl. ............................................ 321/45 S
[51] Int. Cl. ............................................ H02m 1/08
[58] Field of Search ............ 321/45 R, 45 S, 11, 12; 331/113 A

[56] References Cited
UNITED STATES PATENTS

| | | | |
|---|---|---|---|
| 2,950,446 | 8/1960 | Humez et al. | 321/45 R |
| 3,018,382 | 1/1962 | Carroll et al. | 321/45 R |
| 3,172,060 | 3/1965 | Jensen | 321/45 S |
| 3,219,906 | 11/1965 | Keller et al. | 321/45 R X |
| 3,434,036 | 3/1969 | Phillips | 321/45 R |
| 3,444,481 | 5/1969 | Fisher | 321/45 S |

*Primary Examiner*—R. N. Envall, Jr.
*Attorney, Agent, or Firm*—Robert C. Smith; William F. Thornton

[57] ABSTRACT

A two-transformer inverter circuit is described which includes a main output transformer, a saturating feedback transformer, and main switching transistors. A winding of the main output transformer is connected to the feedback transformer through drive-switching transistors so connected that feedback is applied only when the drive switching transistors are turned on. Resistive means, which may be in the form of a voltage divider, is connected betwen the incoming dc power supply and the bases of the drive switching transistors through a breakover diode such that the drive switching transistors are not turned on until the input voltage exceeds a pre-selected value. Additionally, a capacitor may be connected from the break-over diode to a base of the main switching transistors such that the voltage pulse occurring across the break-over diode when it reaches its break-over voltage is applied to the main switching transistors to start the inverter. Other embodiments substitute for the break-over diode, a zener diode and a silicon controlled rectifier or a single zener diode.

12 Claims, 3 Drawing Figures

STARTING CIRCUIT FOR INVERTER

The invention herein described was made in the course of or under a contact with the Navy Department.

BACKGROUND OF THE INVENTION

In transistorized inverters and particularly inverter circuits used in DC to DC converters, difficulty is often encountered in starting, particularly into a highly capacitive load. This difficulty is particularly pronounced if the application of input voltage is slow rather than a fast rising effective transient which can be coupled into the input circuit to start the inverter. Circuits of varying degrees of complexity have been utilized to aid the starting of circuits under these conditions with varying degrees of success. In inverter circuits operating from high voltage supplies, failure to start is particularly serious as a common failure mechanism is a false start in which the inverter, instead of running in full saturation square wave mode runs as a low level sine wave oscillator with high dissipation in the main transistors, which destroys them within milliseconds. A typical prior art two-transformer inverter is shown in Semiconductor Circuits Handbook published by Motorola Semiconductor Products Inc., First edition (1968) p. 2-22, FIG. 2-15.

DESCRIPTION OF THE PREFERRED EMBODIMENTS

Figure 1:
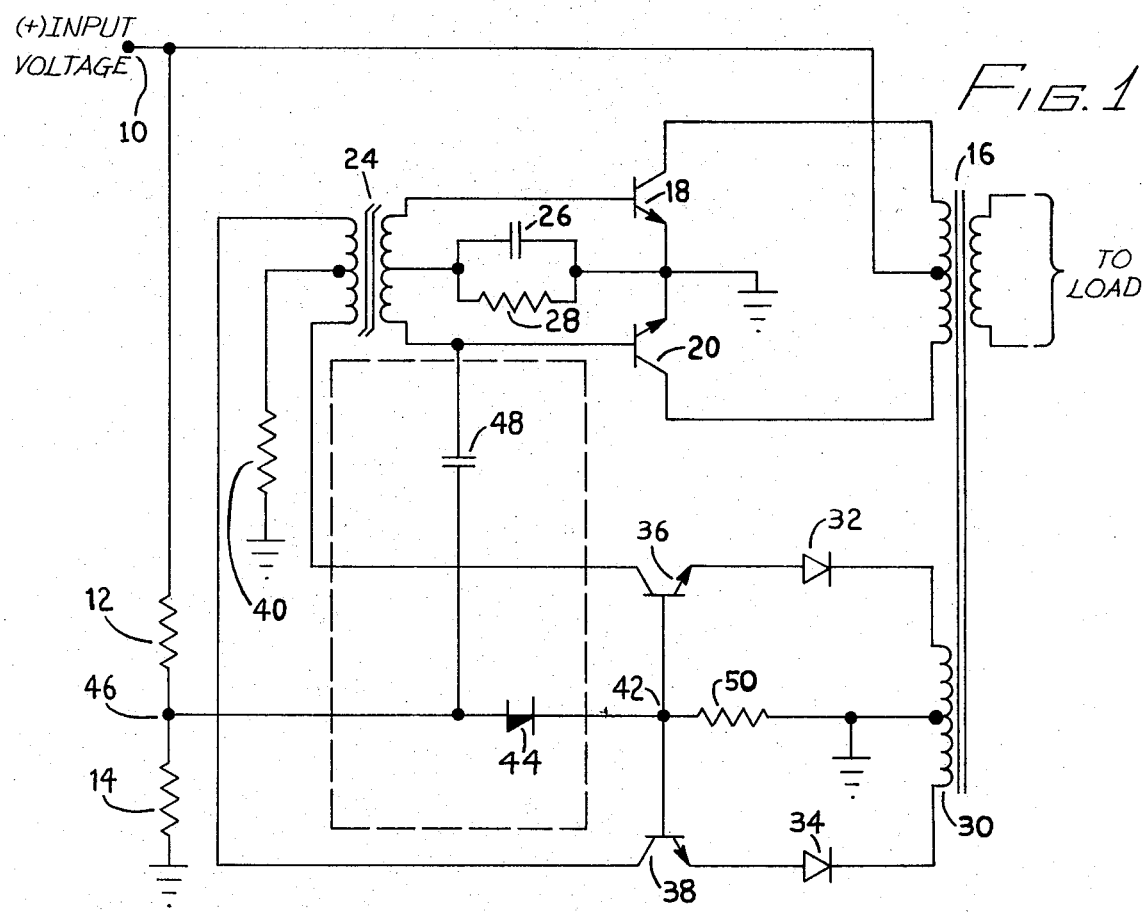
FIG. 1 is a schematic drawing of an inverter circuit according to my invention.

Referring now to FIG. 1, a direct current voltage of varying value is applied between an input terminal 10 and ground. It will be understood that this may be a slowly rising voltage which could take a significant period to rise to a value normally sufficient to start the inverter circuit and which, once reaching a starting value, may not consistently remain at said value. This voltage appears across resistive means which may be a voltage divider consisting of resistors 12 and 14 and is applied to the center tap of the primary winding of a transformer 16, whose secondary winding is connected to a load device. The ends of the primary winding of transformer 16 are connected to the collector circuits of a pair of main switching transistors 18 and 20 whose emitters are connected to a junction 22, also connected to a ground terminal. The base circuits of transistors 18 and 20 are connected to the secondary winding of a saturating base transformer 24. A bias circuit consisting of a capacitor 26 and a resistor 28 connected in parallel is connected between the center-tap of the transformer 24 secondary winding and the junction 22.

Transformer 16 also includes a center-tapped feedback winding 30 with the center tap grounded and its ends connected through a pair of diodes 32 and 34 to the emitter circuits of drive switching transistors 36 and 38 respectively. The collector circuits of transistors 36 and 38 are connected to opposite ends of the primary winding of base drive transformer 24, which winding has a center tap connected to ground through a resistor 40. Transistors 26 and 38 have their base circuits connected together at a junction 42 which is connected through a break-over diode 44 to a junction 46 between resistors 12 and 14. A capacitor 48 may be connected between the base circuit of transistor 20 and one side of the break-over diode 44. Also connected between junction 42 and ground is a resistor 50 which may not always be essential, but which tends to prevent transistors 36 and 38 from being turned "on" prematurely as from leakage current which may flow past diode 44.

In considering operation of the above described circuits, it is useful to consider what happens in a typical prior art circuit when the input voltage is too low to turn on the transistors. Such a circuit may be much like that described except that one-half of the feedback transformer winding would normally be coupled through a resistor to one-half of the saturating base transformer. Normally the voltage applied is at a high level and applied almost instantaneously so that a substantial voltage is induced in the feedback winding which causes the voltage across the saturating base transformer to rise, thus inducing a voltage in the secondary of the base transformer sufficient to cause one of the transistors 18 or 20 to conduct, thereby connecting one side of the primary winding of transformer 16 to ground. Current flows from the supply through the main transformer primary and the transistor 18 or 20 that is conducting until the core of transformer 24 is saturated thereby removing base drive from the "on" main switching transistor. The resulting reduction of current causes the flux in main transformer 16 to decrease, thereby causing a reversal of voltage to transformer 24 thereby causing the opposite of transistors 18 and 20 to conduct and grounding the opposite side of the primary winding of transformer 16 until transformer 24 again saturates in the opposite direction. This is reflected as an alternating voltage to the load. When the input voltage is too low, the transistors 18 and 20 simply fail to conduct and the inverter does not turn on. In another type of inverter where there is a connection from the input terminal to the saturating base transformer to provide some assurance that the transistors conduct, a low input voltage may result in the false start referred to above with excessive heat dissipation and destruction of the transistors. Other types of starting circuits have included unijunction transistors to generate starting pulses for the main switching transistors in inverter arrangements otherwise similar to that described.

In the circuit shown in FIG. 1, the transistors 36 and 38 are arranged as switching devices in the feedback loop. Each transistor passes current on a half cycle of operation of the inverter hence providing full wave drive to the saturating base transformer 24 when the transistors are conducting on their respective half-cycles. Diodes 32 and 34 which may or may not be required depending on the base-emitter breakdown voltage of the transistors, assure that the base-emitter reverse voltage of the transistors 36 and 38 will not be exceeded when the transistor respectively opposite is conducting. When transistors 36 and 38 are in a non-conducting state no drive is applied to the inverter circuit.

Resistors 12 and 14 comprise a voltage divider adjusted to provide a voltage equal to the breakdown voltage of break over diode 44 when the input voltage (which is shown positive for reference) is at the minimum value it is desired to have the inverter circuit begin operation. Break over diode 44 has the property of switching from a high voltage state to a low voltage state at high current when the voltage across the diode exceeds its break over voltage. When the voltage at junction 46 reaches the forward break over voltage of diode 44, current formerly passing through resistor 14 is diverted through the bases of transistors 36 and 38, turning them on. Simultaneously, the voltage transient across diode 44 when it switches from its high voltage to its low voltage state consitutes a voltage pulse applied to capacitor 48 thereby delivering a fast voltage (and current) pulse to the base of the main inverter transistors 18 and 20 to start inverter cycling operation. Capacitor 48 is not always required but does provide a good means for an extra pulse to assure starting of the inverter. During the first portion of the first cycle of inverter operation the transformer windings feeding transistor 36 through diode 32 (or transistor 38 through diode 34) will be driven negative. This action increases the bias current drawn through the base of the transistor and break over diode 44 to increase the base drive to assuredly hold the transistor in its on condition and, by further increasing the current through diode 44, assure a hysteresis in the action of the circuit such that once triggered on it will remain on despite moderate fluctuation of the input voltage below that voltage at which the circuit originally commenced operation.

Figure 2:
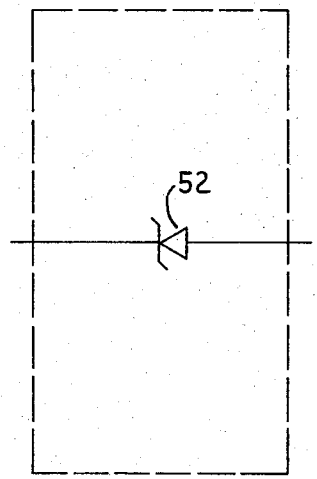
FIG. 2 is a partial schematic drawing of a modification of my inverter circuit.
Figure 3:
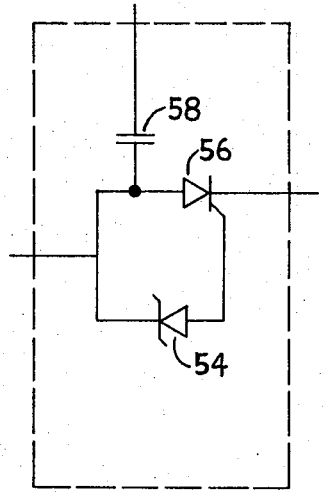
FIG. 3 is a partial schematic drawing of an additional modification of my inverter circuit.

Alternate configurations appearing in FIGS. 2 and 3 may be substituted for the portion shown in dotted outline in FIG. 1. Thus FIG. 2 shows a zener diode 52 which opposes current flow from the voltage developed across resistor 14 thereby preventing turning on of transistors 36 and 38 until it reaches the zener breakdown threshold at which time the voltage is of sufficient magnitude and current begins to flow in the base circuits of the transistors to turn them on. Since the zener diode 52 does not produce the voltage pulse which occures with the break over diode 44, no capacitor like capacitor 48 is included since no switchback effect would be produced. Thus, while the zener diode arrangement is not as satisfactory as that shown in FIG. 1 for many applications, where the voltage source is sufficiently stable or where other starting mechanisms are applied it may be quite adequate.

The modification shown in FIG. 3 includes both a zener diode 54 and a silicon controlled rectifier 56 connected in parallel between junctions 42 and 46 of FIG. 1. A capacitor 58 is also included and the operation of this configuration is almost identical to that of FIG. 1, the silicon controlled rectifier being switched on only after the zener diode threshold voltage is exceeded to cause current to flow in the bases of transistors 36 and 38, turning them on. This causes a voltage transient across capacitor 58 which thereby delivers a pulse to the base circuits of transistors 18 and 20 to start inverter operation, as described above.

While the above invention has been described in connection with a center-tapped primary winding on the main transistor, other arrangements are possible such as bridge circuits into which the main switching transistors may be connected. As indicated, the use of capacitor 48 is not always required nor are diodes 32 and 34 required if the base-emitter breakdown voltage of the transistors 36 and 38 is sufficiently high that the additional protection is not required. Similarly, if leakage through diode 44 or one of the semiconductor circuits of FIGS. 2 or 3 is such that there is no danger of prematurely causing conduction of one of transistors 36 or 38, resistor 50 would not be required.

I claim:

1. In an inverter circuit including a main transformer having a primary winding connected to an input voltage source, a secondary winding and a feedback winding;
   a pair of main switching transistors connected to said primary winding, and
   a saturating feedback transformer having its secondary winding connected to said transistors and its primary winding connected to said feedback winding;
   an improved starting circuit including a pair of drive switching transistors connected between the ends of said feedback winding and the primary winding of said saturating feedback transformer, and a voltage responsive semiconductor switching means connected between said source and said drive switching transistors to prevent said drive switching transistors from conducting until said source reaches a desired value and to then cause said drive switching transistors to conduct when said source exceeds said desired value.

2. An inverter circuit as set forth in claim 1 wherein said semiconductor switching means is a zener diode.

3. An inverter circuit as set forth in claim 1 wherein capacitance means is connected between said semiconductor switching means and the base circuits of said main switching pair of transistors.

4. An inverter circuit as set forth in claim 3 wherein said semiconductor switching means comprises a break over diode.

5. An inverter circuit as set forth in claim 3 wherein said semiconductor switching means includes a zener diode and a silicon controlled rectifier connected in parallel between said voltage divider and said drive switching transistors.

6. In an inverter circuit including a main transformer having a primary winding connected to a voltage source, a secondary winding and a feedback winding;
   a pair of main switching transistors connected to the end terminals of said primary winding;
   a load connected across said secondary winding;
   a saturating feedback transformer having its secondary winding connected to the bases of said pair of transistors;
   an improved starting circuit for said inverter including resistance means connected across said voltage source,
   a drive switching transistor connected between each end of said feedback winding and the ends of the primary winding of said saturating feedback transformer, and
   a voltage responsive semiconductor switching means connected between said resistance means and said drive switching transistors to control conduction of said drive switching transistors when said voltage source reaches a desired level.

7. An inverter circuit as set forth in claim 6 wherein said semiconductor switching means is a zener diode.

8. An inverter circuit as set forth in claim 6 wherein capacitance means is connected between said semiconductor switching means and the base circuits of said main switching transistors.

9. An inverter circuit as set forth in claim 8 wherein said semiconductor switching means comprises a breakover diode.

10. An inverter circuit as set forth in claim 8 wherein said semiconductor switching means includes a zener diode and a silicon controlled rectifier connected in parallel between said voltage divider and said drive switching transistors.

11. An inverter circuit as set forth in claim 6 wherein diodes are connected between said feedback winding and said drive switching transistors and a resistor is connected between said semiconductor switching means and said second named transistors and ground.

12. An inverter as set forth in claim 6 wherein the primary winding of said saturating feedback transformer has a center tap and said center tap is connected to ground through a resistor.

* * * * *